(12) United States Patent
Xi et al.

(10) Patent No.: US 9,939,166 B2
(45) Date of Patent: Apr. 10, 2018

(54) LOW-POWER CONSUMPTION STANDBY CIRCUIT DEVICE, AIR CONDITIONER AND CONTROL METHOD FOR AIR CONDITIONER

(71) Applicant: Gree Electric Appliances, Inc., Guangdong (CN)

(72) Inventors: Tao Xi, Guangdong (CN); Mengchun Tao, Guangdong (CN); Yanliang Wu, Guangdong (CN); Hanqin Wei, Guangdong (CN)

(73) Assignee: GREE ELECTRIC APPLIANCES INC., Guangdong (CN)

( * ) Notice: Subject to any disclaimer, the term of this patent is extended or adjusted under 35 U.S.C. 154(b) by 390 days.

(21) Appl. No.: 14/648,163

(22) PCT Filed: Apr. 30, 2014

(86) PCT No.: PCT/CN2014/076600
§ 371 (c)(1),
(2) Date: May 28, 2015

(87) PCT Pub. No.: WO2014/177056
PCT Pub. Date: Nov. 6, 2014

(65) Prior Publication Data
US 2016/0273792 A1   Sep. 22, 2016

(30) Foreign Application Priority Data

May 2, 2013   (CN) .......................... 2013 1 0158665

(51) Int. Cl.
*F24F 11/00*    (2018.01)
*H02J 9/04*     (2006.01)
*H02J 9/00*     (2006.01)

(52) U.S. Cl.
CPC ............ *F24F 11/006* (2013.01); *F24F 11/00* (2013.01); *F24F 11/30* (2018.01); *F24F 11/62* (2018.01);
(Continued)

(58) Field of Classification Search
CPC .. F24F 11/006; F24F 11/00; F24F 2011/0073; F24F 2911/0075; H02J 9/04; H02J 9/00
(Continued)

(56) References Cited

U.S. PATENT DOCUMENTS 7,015,599 B2 *  3/2006  Gull ........................ H02J 3/005
                                                        307/64
8,324,755 B2 * 12/2012  Stair ........................ H02J 3/14
                                                        307/23
(Continued)

FOREIGN PATENT DOCUMENTS

CN       1324443 A    11/2001
CN     201178462 Y     1/2009
(Continued)

OTHER PUBLICATIONS

Patent Cooperation Treaty: International Search Report of PCT/CN2014/076600; Li, Yuhong; Aug. 6, 2014; 6 pages.

*Primary Examiner* — Dinh T Le
(74) *Attorney, Agent, or Firm* — Munck Wilson Mandala LLP

(57) ABSTRACT

Disclosed is a low-power consumption standby circuit device comprising a primary power supply, a secondary power supply, a first control switch and a control circuit module. An input terminal of the primary power supply is connected with an external power supply via the first control switch. An output terminal is connected with external loads to power the external loads. An input terminal of the secondary power supply is connected to the external power
(Continued)

supply and an output terminal is electrically connected with the control circuit module. The control circuit module comprises an MCU module and a signal receiving circuit, wherein the MCU module controls the on-off of the first control switch. An air conditioner adopting the circuit device achieves a quasi zero-watt standby target through a reasonable power supply distribution and enhancing the anti-interference capability of a main chip. A control method for the air conditioner is also disclosed.

12 Claims, 3 Drawing Sheets

(52) U.S. Cl.
CPC ................ *H02J 9/04* (2013.01); *F24F 11/46* (2018.01); *F24F 11/61* (2018.01); *F24F 2011/0075* (2013.01); *H02J 9/00* (2013.01)

(58) Field of Classification Search
USPC .......................................................... 307/23
See application file for complete search history.

(56) References Cited

U.S. PATENT DOCUMENTS

| | | | |
|---|---|---|---|
| 8,987,946 B2* | 3/2015 | Higashiyama | F24F 11/02 307/113 |
| 9,444,215 B1* | 9/2016 | Gapontsev | H01S 3/094003 |
| 2012/0257428 A1* | 10/2012 | Nomura | H02J 9/005 363/126 |

FOREIGN PATENT DOCUMENTS

| | | |
|---|---|---|
| CN | 201191021 Y | 2/2009 |
| CN | 202077124 U | 12/2011 |
| CN | 202583744 U | 12/2012 |
| CN | 203215919 U | 9/2013 |
| CN | 203299563 U | 11/2013 |

* cited by examiner

LOW-POWER CONSUMPTION STANDBY CIRCUIT DEVICE, AIR CONDITIONER AND CONTROL METHOD FOR AIR CONDITIONER

CROSS-REFERENCE TO RELATED APPLICATIONS

This application is a U.S. National Phase application submitted under 35 U.S.C. § 371 of Patent Cooperation Treaty application serial no. PCT/CN2014/076600, filed Apr. 30, 2014, and entitled LOW-POWER CONSUMPTION STANDBY CIRCUIT DEVICE, AIR CONDITIONER, AND CONTROL METHOD FOR AIR CONDITIONER, which application claims priority to Chinese patent application serial no. 201310158665.0, filed May 2, 2013, and entitled 低功耗待机 电路装置和空 调器及空调器的控制方法

Patent Cooperation Treaty application serial no. PCT/CN2014/076600, published as WO 2014/177056, and Chinese patent application serial no. 201310158665.0, are incorporated herein by reference.

TECHNICAL FIELD

The present disclosure relates to the field of electricity and refrigeration, more particularly, to a low-power consumption standby circuit device, an air conditioner and a control method for air conditioner.

BACKGROUND

The current controllers of household electrical appliances are usually powered by a one-mode power supply. For example, even if the controller of the air conditioner is on standby, the circuit of swing motor, the display panel of indoor unit, the mainboard, and the main chip of display panel are all powered on. The power consumption of the air conditioner on standby is over 3 watts, which not only wastes electric energy, but also increases potential safety hazards.

SUMMARY

In order to overcome the defects existing in the prior art, the present disclosure provides a low-power consumption standby circuit device, an air conditioner and a control method for air conditioner, which realize a low-power consumption when the air conditioner is on standby through a reasonable power supply distribution; and the technical solutions of the present disclosure are as follows:

A low-power consumption standby circuit device comprises a primary power supply, a secondary power supply, a first control switch and a control circuit module;

an input terminal of the primary power supply is electrically connected with an external power supply via the first control switch, and an output terminal of the primary power supply is electrically connected with external loads to power the external loads;

an input terminal of the secondary power supply is directly and electrically connected with the external power supply, and an output terminal of the secondary power supply is electrically connected with the control circuit module;

the control circuit module comprises an MCU module and a signal receiving circuit, and the MCU module controls on-off of the first control switch.

Further, the low-power consumption standby circuit device further comprises a second control switch;

the MCU module includes a first MCU and a second MCU; the first MCU is serially connected with the second control switch and the secondary power supply in sequence; the second MCU is electrically connected with the secondary power supply; the first MCU and the second MCU are both powered by the secondary power supply;

the first MCU controls on-off of the first control switch; and the second MCU controls on-off of the second control switch.

Further, the low-power consumption standby circuit device further comprises a voltage stabilizing module;

the output terminal of the secondary power supply is electrically connected with a voltage stabilizing module in series, and is in turn electrically connected to the first MCU and the second MCU.

Further, the primary power supply has a multiplexed output; and the secondary power supply has a single output or a multiplexed output.

Further, the control circuit module further comprises a reset circuit and a display module; and the reset circuit and the display module are electrically connected with the output terminal of the secondary power supply respectively.

An air conditioner comprises an indoor unit and an outdoor unit;

the air conditioner includes the low-power consumption standby circuit device above;

the low-power consumption standby circuit device is electrically connected with an external power supply for powering the indoor unit and the outdoor unit of the air conditioner;

a third control switch is electrically connected between the outdoor unit and the indoor unit to connect or disconnect a power supply connection between the outdoor unit and the indoor unit; and the MCU module is associated with the third control switch to control on-off of the third control switch.

An air conditioner comprises an indoor unit and an outdoor unit;

the air conditioner includes the low-power consumption standby circuit device above;

the low-power consumption standby circuit device is electrically connected with an external power supply for powering the indoor unit and the outdoor unit of the air conditioner;

a third control switch is electrically connected between the outdoor unit and the indoor unit to connect or disconnect a power supply connection between the outdoor unit and the indoor unit; and the first MCU is electrically connected with the third control switch to control on-off of the third control switch.

A control method for the air conditioner comprises a starting process, and the starting process comprises the following steps:

when the MCU module of the control circuit module of the low-power consumption standby circuit device in the air conditioner receives a starting signal or is re-energized, the MCU module controls the first control switch to be on first; then controls the third control switch of the air conditioner to be on; the primary power supply of the low-power consumption standby circuit device, the load circuits of the outdoor unit and the indoor unit is energized, and the air conditioner enters a normal running state.

A control method for the air conditioner comprises a standby process; and the standby process comprises the following steps:

when the air conditioner enters standby mode, the MCU module controls the third control switch to be off first; then controls the first control switch to be off, so as to disconnect electrical connection between the indoor unit and outdoor unit and disconnect electrical connection between the primary power supply and the external power supply; and the MCU module enters a low-power consumption mode.

Further, the standby process comprises the following steps:

when the MCU module receives a shutdown signal, the MCU module controls the third control switch to be off first, so as to switch off the outdoor unit; then controls the first control switch to be off, so as to switch off the primary power supply;

judge whether the MCU module has received an operating signal within a first preset time after the first control switch is switched off; if yes, forbid the MCU module to enter the low-power consumption mode; if not, the MCU module enters a low-power consumption mode.

A control method for the air conditioner comprises a starting process; and the starting process comprises the following steps:

when the second MCU module of the control circuit module of the low-power consumption standby circuit device in the air conditioner receives a starting signal or is re-energized, the second MCU module controls the second control switch of the low-power consumption standby circuit device to be on; the first MCU of the low-power consumption standby circuit device is energized;

the first MCU first controls the first control switch to be on first, then controls the third control switch of the air conditioner to be on; the primary power supply, the load circuits of the outdoor unit and the indoor unit being energized, and the air conditioner enters a normal running state.

A control method comprises a standby process; and the standby process comprises the following steps:

after the air conditioner enters standby mode, the first MCU controls the third control switch to be off first; then controls the first control switch to be off, so as to disconnect electrical connection between the indoor unit and the outdoor unit, and disconnect electrical connection between the primary power supply and the external power supply;

the second MCU controls the second control switch to be off, and disconnects electrical connection between the first MCU and the second MCU, and the MCU enters a low-power consumption mode.

Further, the standby process comprises the following steps:

when the first MCU module receives a shutdown signal sent from the second MCU, and hasn't received any further signals from the second MCU within a second preset time, the first MCU controls the third control switch to be off first, so as to de-energize the outdoor unit; then the first MCU controls the first control switch to be off, so as to de-energize the primary power supply;

Judge whether the second MCU has received an operating signal within the third preset time after the first control switch is switched off; if yes, forbid the MCU to enter the low-power consumption mode; if not, the second MCU controls the second control switch to be off, and the second MCU enters the low-power consumption mode.

The effects of the present disclosure are as follows:

According to the low-power consumption standby circuit device, the air conditioner and the control method for air conditioner of the present disclosure, the air conditioner is provided with the low-power consumption standby circuit device, which is powered by a two-mode switching power supply. According to the control method for air conditioner of the present disclosure, the external power supply of outdoor unit and the primary power supply are switched off when the air conditioner is on standby; furthermore, when two MCUs are adopted, the power supply VCC on the mainboard is also switched off, the mainboard is not energized, and only the main chip of display panel and the signal receiving circuit are powered by the secondary power supply. As compared with the scheme that one chip controls both the loads on the mainboard and the loads on the display panel, when two main chips are provided, the scheme that two main chips respectively control the loads on the mainboard and the load on the display panel reduces communication interfaces of chips, wherein the connection wires, which are connected between the display panel and the mainboard and used for controlling loads, are omitted, thereby reducing the production cost and increasing the production efficiency; the main chip of display panel enters a low-power consumption mode when the air conditioner is on standby, namely, when a standby signal is received, the frequency of the main chip of display panel decreases. The control method of the present disclosure can achieve the quasi zero-watt (i.e. less than 50 milliwatts) standby through a reasonable power supply distribution, which not only reduces the power consumption of the air conditioner on standby, but also enhances the anti-interference capability of the main chips.

DETAILED DESCRIPTION

In order to make the object, the technical solutions and the advantages of the present disclosure clearer, the low-power consumption standby circuit device, the air conditioner and the control method for the air conditioner of the present disclosure will be described in more details with reference to the accompanying figures and embodiments. It should be understood that, the preferred embodiments below are described only for illustration of the present invention, but not for limiting the present invention.

Figure 1:
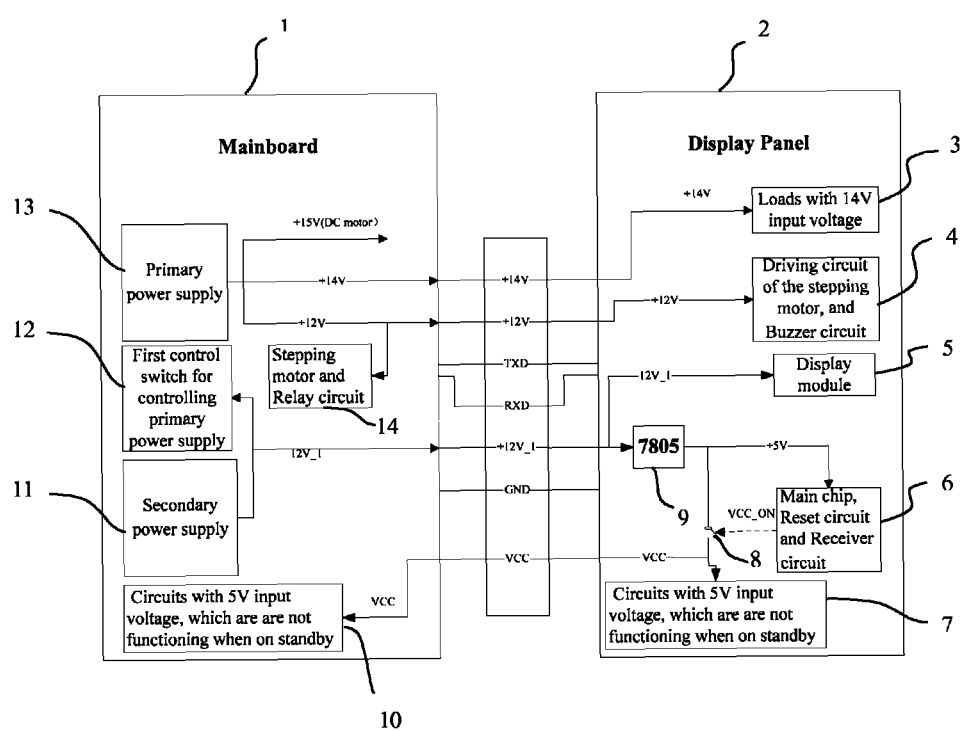
FIG. 1 is a schematic circuit connection diagram of the circuits of air conditioner according to one embodiment of the present invention.

As shown in FIG. 1, the air conditioner of the present disclosure includes an indoor unit and an outdoor unit. A third control switch is electrically connected between the outdoor unit and the indoor unit so as to connect or disconnect the power supply connection between the outdoor unit and the indoor unit. The air conditioner is further provided with a low-power consumption standby circuit device.

The low-power consumption standby circuit device includes a primary power supply 13, a secondary power supply 11, a first control switch 12 and a control circuit module.

An input terminal of the primary power supply 13 is electrically connected with an external power supply via the first control switch 12, and an output terminal of the primary power supply 13 is electrically connected with external loads to power the external loads such that the low-power consumption standby circuit device electrically connected with the external power supply supplies power to the indoor unit and the outdoor unit of the air conditioner.

The external loads include a first load 3, a second load 4, a sixth load 14 and a DC motor (not shown in Figures). Wherein, the first load 3 is a load with 14V input voltage, for example, a heating wire or other additional functional loads. The second load 4 includes a driving circuit of a stepping motor and a buzzer circuit both with 12V input voltage, which are provided on the display panel or on the mainboard. The sixth load 14 includes a stepping motor.

An input terminal of the secondary power supply 11 is directly and electrically connected with the external power supply, and an output terminal of the secondary power supply 11 is electrically connected with the control circuit module. The control circuit module comprises an MCU module and a signal receiving circuit. The MCU module controls the on-off of the first control switch 12. The MCU module may include one MCU or two MCUs, namely, the MCU module may include one main chip or two main chips. The signal receiving circuit is configured to transmit operating signals for the air conditioner to the MCU module.

Preferably, as one of the embodiments, the low-power consumption standby circuit device further includes a second control switch 8. The MCU module includes a third load 6, a fourth load 7 and a fifth load 10. The low-power consumption standby circuit device may further be provided with a display module 5, the display module 5 is electrically connected with the output terminal of the secondary power supply 11. The display module 5 is a display screen or a nixietube.

Wherein, the third load 6 includes a second MCU (i.e., the main chip of the display panel) and a reset circuit. The second MCU controls the running of the loads on the display panel 2. The fourth load 7 includes other circuits with 5V input voltage, which are disposed on the display panel and are not functioning when the air conditioner is on standby. The fifth load 10 includes a first MCU (i.e., the main chip of the mainboard) and other circuits on the mainboard 1, which are not functioning when the air conditioner is on standby. The first MCU controls the running of the loads on the mainboard 1. The signal receiving circuit is electrically connected with the second MCU and is configured to transmit operating signals for the air conditioner to the second MCU. The signal receiving circuit is a remote controlled receiver circuit or/and a keying circuit. Alternatively, the signal receiving circuit could be disposed in the third load 6.

The first MCU is serially connected with the second control switch 8 and the secondary power supply 11 in sequence. The second MCU is electrically connected with the secondary power supply 11. The first MCU and the second MCU are both powered by the secondary power supply 11. The first MCU controls the on-off of the first control switch 12. The second MCU controls the on-off of the second control switch 8. The first MCU is electrically connected with the third control switch to control the on-off of the third control switch.

Wherein, the primary power supply 13, the secondary power supply 11, the first MCU, the first control switch 12 and the third control switch are disposed on the mainboard 1; the second MCU and the second control switch 8 are disposed on the display panel 2.

Preferably, the first control switch 12 and the third control switch are relays, the second control switch 8 is a triode or a relay.

Preferably, in one of the embodiments, the output terminal of the secondary power supply 11 is electrically connected with a voltage stabilizing module 9 in series, and is in turn electrically connected to the first MCU and the second MCU. The voltage stabilizing module 9 is an IC7805 or a DC-DC module.

The primary power supply 13 and the secondary power supply 11 are both switching power supplies. The primary power supply 13 has a multiplexed output, and the secondary power supply 11 has a single output or a multiplexed output, wherein the single output means outputting only one kind of output voltage, the multiplexed output means outputting several kinds of output voltages, such as outputting voltages of 5V, 12V, 15V and so on. Preferably, the primary power supply 13 has three output voltages of 12V, 14V and 15V respectively. The secondary power supply 11 has only one output voltage of 12V.

When the air conditioner operates normally, the primary power supply 13 and the secondary power supply 11 both operate. The primary power supply 13 outputs three kinds of voltages, wherein, the 15V output voltage powers the DC motor; the 14V output voltage powers other functional circuits such as the heating wire or other additional functional circuits; the 12V output voltage powers the buzzer circuit disposed on the display panel 2 or on the mainboard 1, and powers the driving circuit of the stepping motor for sweeping around, and powers the stepping motor as well.

The secondary power supply 11 has one output voltage, and the output terminal 12V_1 powers the first control switch 12, which is disposed on the mainboard 1 and controls the on-off of the primary power supply 13. The first control switch 12 is connected with the first MCU, and the first MCU controls the on-off of the first control switch 12. The secondary power supply 11 also powers the display module 5 and the voltage stabilizing module 9 on the display panel 2. The voltage stabilizing module 9 has at least two voltage outputs, one is +5V output for powering the second MCU, the reset circuit and the signal receiving circuit, the other is power supply VCC (the voltage is also +5V) for powering the first MCU, and the other circuits on the mainboard 1 which are not functioning when the air conditioner is on standby. A second control switch 8 is electrically connected in the circuit of power supply VCC, the second control switch 8 is connected with the pin VCC_ON of the second MCU, and the second MCU (i.e. the main chip of the display panel) controls the on-off of the second control switch 8. When the air conditioner operates normally, the second MCU controls the second control switch 8 to be on, then the +5V power supply VCC gets switched on (namely, voltage of VCC equals 5V).

The first MCU is communicatively connected with the second MCU, wherein TXD is a serial JO port of the second MCU for transmitting data, and RXD is a serial JO port of the second MCU for receiving data.

The ground terminals GND of the first load 3, the second load 4 and the sixth load 14 are electrically connected with the ground terminal (the negative terminal) of the primary power supply 13. The ground terminals GND of the display module 5, the voltage stabilizing module 9, the third load 6, the fourth load 7 and the fifth load 10 are electrically connected with the ground terminal (the negative terminal) of the secondary power supply 11.

The first MCU is associated with the second load 4, the display module 5, the reset circuit and the receiver circuit. The first MCU controls the working states of the second load 4, the display module 5, the reset circuit and the receiver circuit.

When the MCU module has one MCU, the mainboard 1 and display panel 2 are both controlled by the MCU. The working procedure of the air conditioner comprises a starting process, and the starting process includes the following steps:

When the MCU module of the control circuit module of the low-power consumption standby circuit device in the air conditioner receives a starting signal or is re-energized, the MCU module controls the first control switch 12 to be on first, then controls the third control switch of the air conditioner to be on; the primary power supply 13 of the low-power consumption standby circuit device, the load circuits of the outdoor unit and the indoor unit are energized, and the air conditioner enters a normal running state.

When the MCU module has one MCU, the working procedure of the air conditioner comprises a standby process, and the standby process comprises the following steps:

When the air conditioner enters the standby mode, the MCU module controls the third control switch to be off first; then controls the first control switch 12 to be off, so as to disconnect the electrical connection between the indoor unit and outdoor unit, and disconnect the electrical connection between the primary power supply 13 and the external power supply.

The MCU module enters a low-power consumption mode, namely, the clock frequency of MCU on the MCU module is lower than the preset frequency in normal running state. When the air conditioner is turned off, the loads in the outdoor unit and the indoor unit of the air conditioner are de-energized, and the air conditioner enters standby. The MCU exits the low-power consumption mode when receiving a starting signal.

Preferably, as one of the embodiments, the standby process comprises the following steps:

When the MCU module receives a shutdown signal, the MCU module controls the third control switch to be off first, so as to switch off the outdoor unit; then controls the first control switch 12 to be off, so as to switch off the primary power supply 13.

Judge whether the MCU module has received an operating signal within the first preset time after the first control switch 12 is switched off; if yes, forbid the MCU module to enter the low-power consumption mode; if not, the MCU module enters the low-power consumption mode. Preferably, the first preset time is 1 minute.

Figure 3:
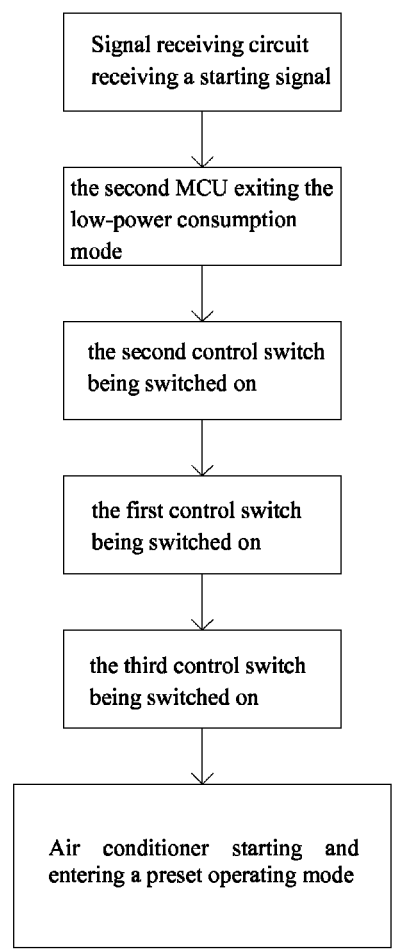
FIG. 3 is a control flow chart illustrating the starting process of the circuits shown in FIG. 1.

When the MCU module includes two MCUs, namely, the first MCU and the second MCU, the working procedure of air conditioner comprises a starting process as shown in FIG. 3.

The starting process includes the following steps: when the second MCU module receives the starting signal or is re-energized, the second MCU module controls the second control switch 8 to be on; the first MCU is energized and controls the first control switch 12 and the third control switch to be on in sequence; the primary power supply 13, the load circuits of the outdoor unit and the indoor unit are energized, and the air conditioner enters a normal running state.

Figure 2:
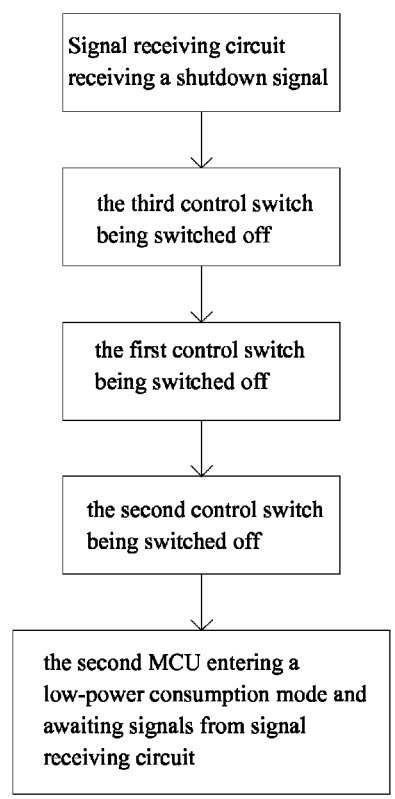
FIG. 2 is a control flow chart illustrating the standby process of the circuits shown in FIG. 1.

When the MCU module includes two MCUs, the working procedure of air conditioner comprises a standby process as shown in FIG. 2.

The standby process includes the following steps: after the air conditioner enters standby, the first MCU controls the third control switch to be off first; then controls the first control switch 12 to be off, so as to disconnect the electrical connection between the indoor unit and the outdoor unit, and disconnect the electrical connection between the primary power supply and the external power supply.

The second MCU controls the second control switch 8 to be off, and disconnects the electrical connection between the first MCU and the second MCU, and the MCU enters a low-power consumption mode.

The MCU entering a low-power consumption mode means that the clock frequency of the second MCU is lower than the preset frequency in normal running state.

Preferably, as one of the embodiments, the standby process comprises the following steps:

S1: when the first MCU module receives a shutdown signal sent from the second MCU, and hasn't received any further signals from the second MCU within the second preset time, the first MCU controls the third control switch to be off first, so as to de-energize the outdoor unit; then the first MCU controls the first control switch 12 to be off, so as to de-energize the primary power supply 13.

S2: Judge whether the second MCU has received an operating signal within the third preset time after the first control switch is switched off; if yes, forbid the MCU to enter the low-power consumption mode; if not, the second MCU controls the second control switch 8 to be off, and the second MCU enters the low-power consumption mode.

The operating signal is a remote control signal, a keying signal or a touch signal. Preferably, the second preset time is 5 minutes, the third preset time is 1 minute.

In the embodiments above, the second MCU may adopt two-divided-frequency technique, namely, the frequency of the second MCU in low-power consumption mode is one half of the preset frequency in normal running state. The second MCU exits the low-power consumption mode when receiving a starting signal.

When the air conditioner is on standby, the low-power consumption standby circuit device is powered by the secondary power supply 11 only. The signal from the pin VCC_ON controls the 5V power supply VCC to be switched off (namely, voltage of VCC equals 0V), and the mainboard is de-energized, only the second MCU (the main chip of the display panel), the reset circuit and the receiver circuit in the low-power consumption standby circuit device are powered on.

When the second MCU receives an effective remote control signal, a keying signal or a touch signal, or is re-energized, the second MCU controls the 5V power supply VCC to be switched on and the first MCU is powered on. The first MCU which is energized controls the first control switch 12 and the third control switch to be switched on, the primary power supply 13 and the electric control board of the outdoor unit are powered on and the air conditioner runs normally.

In the embodiments above, the low-power consumption standby circuit device is disposed in the air conditioner, so that, in the control of the air conditioner, through a reasonable power supply distribution, the driving circuit is powered by the primary power supply, and the display panel is powered by the secondary power supply. When the air conditioner enters standby, the power supply of the outdoor unit is switched off first, then the primary power supply is switched off; when two MCUs are adopted, the power supply VCC on the mainboard is switched off as well finally. The secondary power supply only powers the display panel, for example, the secondary power supply only powers the main chip of the display panel and the remote controlled receiver circuit (namely, the signal receiving circuit), so as to achieve the quasi zero-watt standby target (namely, the power of the air conditioner on standby is less than 50 milliwatts). The present disclosure solves the technical problem of a large on-standby power consumption of the existing air conditioners (especially the inverter air conditioner). As compared with the scheme that one chip controls both the loads on the mainboard and the loads on the display panel, when two main chips are provided, the scheme that two main chips respectively control the loads on the mainboard and the loads on the display panel reduces communication interfaces of chips, wherein the connection wires, which are connected between the display panel and the mainboard and used for controlling loads, are omitted, thereby reducing the production cost, increasing the production efficiency, and enhancing the anti-interference capability of the main chips. When the air conditioner is on standby, only the second MCU (the main chip on the display panel) is powered on, as compared with the single MCU control scheme, the number of energized elements is reduced and the on-standby power consumption of the air conditioner is further reduced.

The embodiments described above are described concretely and in details only for illustration of the present invention, but not for limiting the scope of the present invention. It should be understood by those skilled in the art that, without departing from the thoughts of the present disclosure, various variations and improvements may be made within the scope of the present invention. The scope of the present invention is based on the appended claims.

What is claimed is:

1. A low-power consumption standby circuit device, comprising a primary power supply, a secondary power supply, a first control switch and a control circuit module; wherein:
   an output terminal of the primary power supply is electrically connected with external loads to power the external loads;
   an output terminal of the secondary power supply is electrically connected with the control circuit module; and
   the control circuit module comprises an MCU module, a signal receiving circuit, a reset circuit and a display module; the reset circuit and the display module are electrically connected with the output terminal of the secondary power supply respectively, and the MCU module controls on-off of the first control switch.

2. The low-power consumption standby circuit device according to claim 1, further comprising a second control switch; wherein:
   the MCU module includes a main chip of a mainboard and a main chip of a display panel; the main chip of the mainboard is serially connected with the second control switch and the secondary power supply in sequence; the main chip of the display panel is electrically connected with the secondary power supply; the main chip of the mainboard and the main chip of the display panel are both powered by the secondary power supply;
   the main chip of the mainboard controls on-off of the first control switch; and the main chip of the display panel controls on-off of the second control switch.

3. The low-power consumption standby circuit device according to claim 1, further comprising a voltage stabilizing module; wherein:
   the output terminal of the secondary power supply is electrically connected with a voltage stabilizing module in series, and is in turn electrically connected to a main chip of a mainboard and a main chip of a display panel.

4. The low-power consumption standby circuit device according to claim 1, wherein:
   the primary power supply outputs several kinds of output voltages; and
   the secondary power supply has a single output or outputs several kinds of output voltages.

5. The low-power consumption standby circuit device of claim 1, wherein the low-power consumption standby circuit device is configured to execute a standby process comprising:
   wherein responsive to entering a standby mode, the MCU module controls the third control switch to be off first, controls the first control switch to be off, so as to disconnect electrical connection between the indoor unit and outdoor unit; and
   wherein the MCU module enters a low-power consumption mode.

6. The low-power consumption standby circuit device of claim 1, wherein: the low-power consumption standby circuit device is configured to execute a standby process comprising:
   when the MCU module receives a shutdown signal, the MCU module controls the third control switch to be off first, so as to switch off the outdoor unit and controls the first control switch to be off, so as to switch off the primary power supply; and
   judging whether the MCU module has received an operating signal within a first preset time after the first control switch is switched off; if yes, forbidding the MCU module to enter the low-power consumption mode and if not, the MCU module entering a low-power consumption mode.

7. An air conditioner, comprising an indoor unit and an outdoor unit, wherein:
   the air conditioner includes a low-power consumption standby circuit device, comprising:
   a primary power supply, a secondary power supply, a first control switch and a control circuit module; wherein:
      an output terminal of the primary power supply is electrically connected with external loads to power the external loads;
      an output terminal of the secondary power supply is electrically connected with the control circuit module;
      the control circuit module comprises an MCU module, a signal receiving circuit, a reset circuit and a display module; the reset circuit and the display module are electrically connected with the output terminal of the secondary power supply respectively, and the MCU module controls on-off of the first control switch; and
   a third control switch is electrically connected between the outdoor unit and the indoor unit to connect or disconnect a power supply connection between the outdoor unit and the indoor unit; and the MCU module is associated with the third control switch to control on-off of the third control switch.

8. The air conditioner of claim 7, wherein the air conditioner is configured to execute a starting process comprising:
   wherein responsive to the MCU module of the control circuit module of the low-power consumption standby circuit device in the air conditioner receiving a starting signal or is re-energizing, the MCU module controls the first control switch to be on first, then controls the third control switch of the air conditioner to be on and controls the primary power supply of the low-power consumption standby circuit device, the load circuits of the outdoor unit and the indoor unit being energized, and the air conditioner to enter a normal running state.

9. An air conditioner, comprising an indoor unit and an outdoor unit, wherein:

the air conditioner includes a low-power consumption standby circuit device, comprising:

a primary power supply, a secondary power supply, a first control switch and a control circuit module; wherein:

an output terminal of the primary power supply is electrically connected with external loads to power the external loads;

an output terminal of the secondary power supply is electrically connected with the control circuit module;

the control circuit module comprises an MCU module, a signal receiving circuit, a reset circuit and a display module; the reset circuit and the display module are electrically connected with the output terminal of the secondary power supply respectively, and the MCU module controls on-off of the first control switch and a second control switch;

wherein:

the MCU module includes a main chip of a mainboard and a main chip of a display panel; the main chip of the mainboard is serially connected with the second control switch and the secondary power supply in sequence; the main chip of the display panel is electrically connected with the secondary power supply; the main chip of the mainboard and the main chip of the display panel are both powered by the secondary power supply;

the main chip of the mainboard controls on-off of the first control switch; and the main chip of the display panel controls on-off of the second control switch; and a third control switch is electrically connected between the outdoor unit and the indoor unit to connect or disconnect a power supply connection between the outdoor unit and the indoor unit; and the main chip of the mainboard is electrically connected with the third control switch to control on-off of the third control switch.

10. The air conditioner of claim 9, wherein the air conditioner is configured to execute a starting process wherein:

when the main chip of the display panel module of the control circuit module of the low-power consumption standby circuit device in the air conditioner receives a starting signal or is re-energized, the main chip of the display panel module controls the second control switch of the low-power consumption standby circuit device to be on and controls the main chip of the mainboard of the low-power consumption standby circuit device to be energized; and wherein the main chip of the mainboard controls the first control switch to be on first, controls the third control switch of the air conditioner to be on and controls the primary power supply, the load circuits of the outdoor unit and the indoor unit to be energized, and the air conditioner to enter a normal running state.

11. The air conditioner of claim 9, wherein the air conditioner is configured to execute a standby process comprising:

wherein after the air conditioner enters a standby mode, the main chip of the mainboard controls the third control switch to be off, controls the first control switch to be off, so as to disconnect electrical connection between the indoor unit and the outdoor unit; and wherein the main chip of the display panel controls the second control switch to be off, and disconnects electrical connection between the main chip of the mainboard and the main chip of the display panel, causing the MCU to enter a low-power consumption mode.

12. The air conditioner according to claim 11, wherein, the:

when the first MCU main chip of the mainboard module receives a shutdown signal sent from the main chip of the display panel, and hasn't received any further signals from the main chip of the display panel within a second preset time, the main chip of the mainboard controls the third control switch to be off, so as to de-energize the outdoor unit and controls the main chip of the mainboard controls the first control switch to be off, so as to de-energize the primary power supply; and wherein the main chip of the display panel module is configured to judge whether the main chip of the display panel has received an operating signal within the third preset time after the first control switch is switched off; if yes, forbidding the MCU to enter the low-power consumption mode and if not, the main chip of the display panel controlling the second control switch to be off, and the main chip of the display panel enter the low-power consumption mode.

* * * * *